INVENTOR
EDWARD H. SUSSENGUTH

ATTORNEY

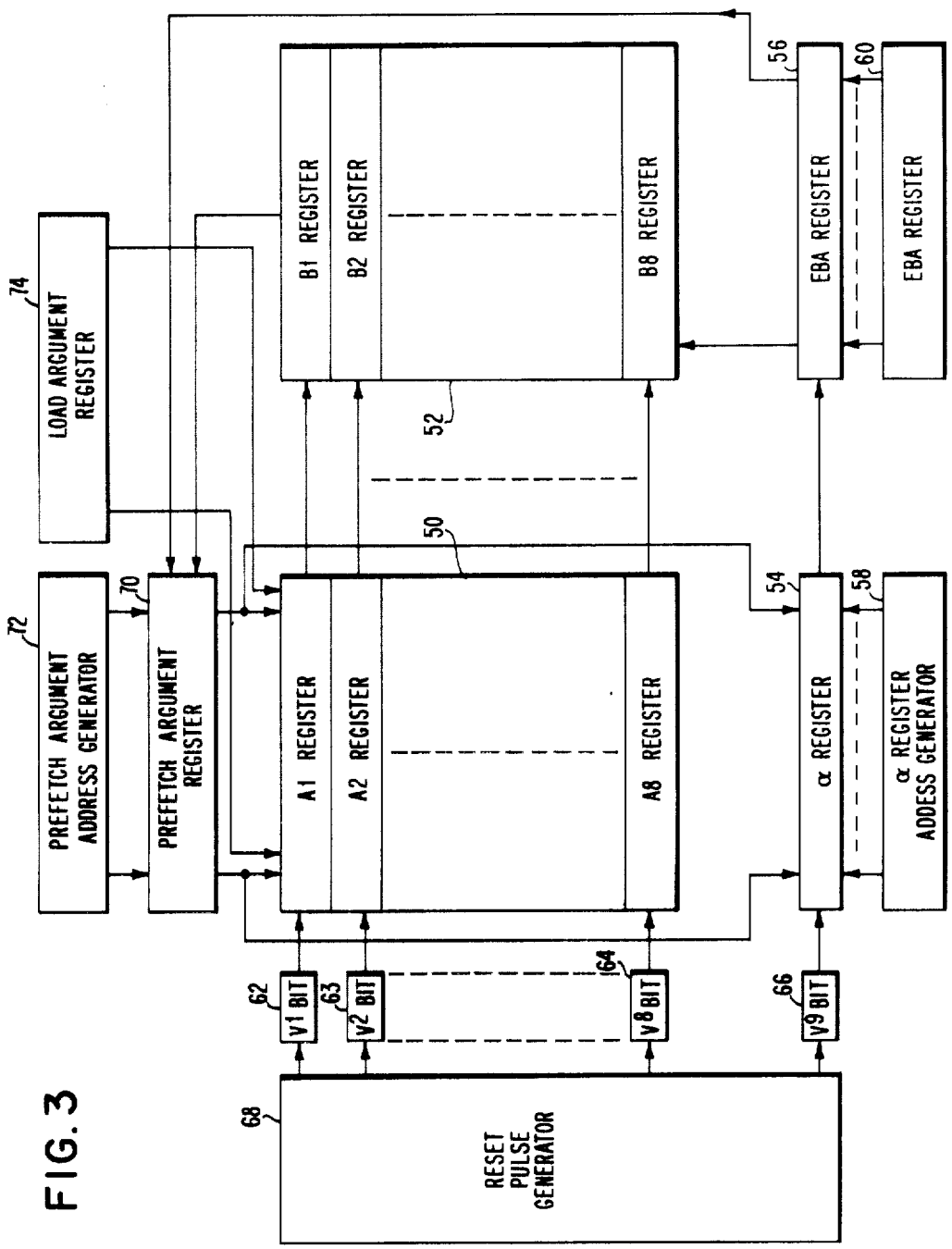

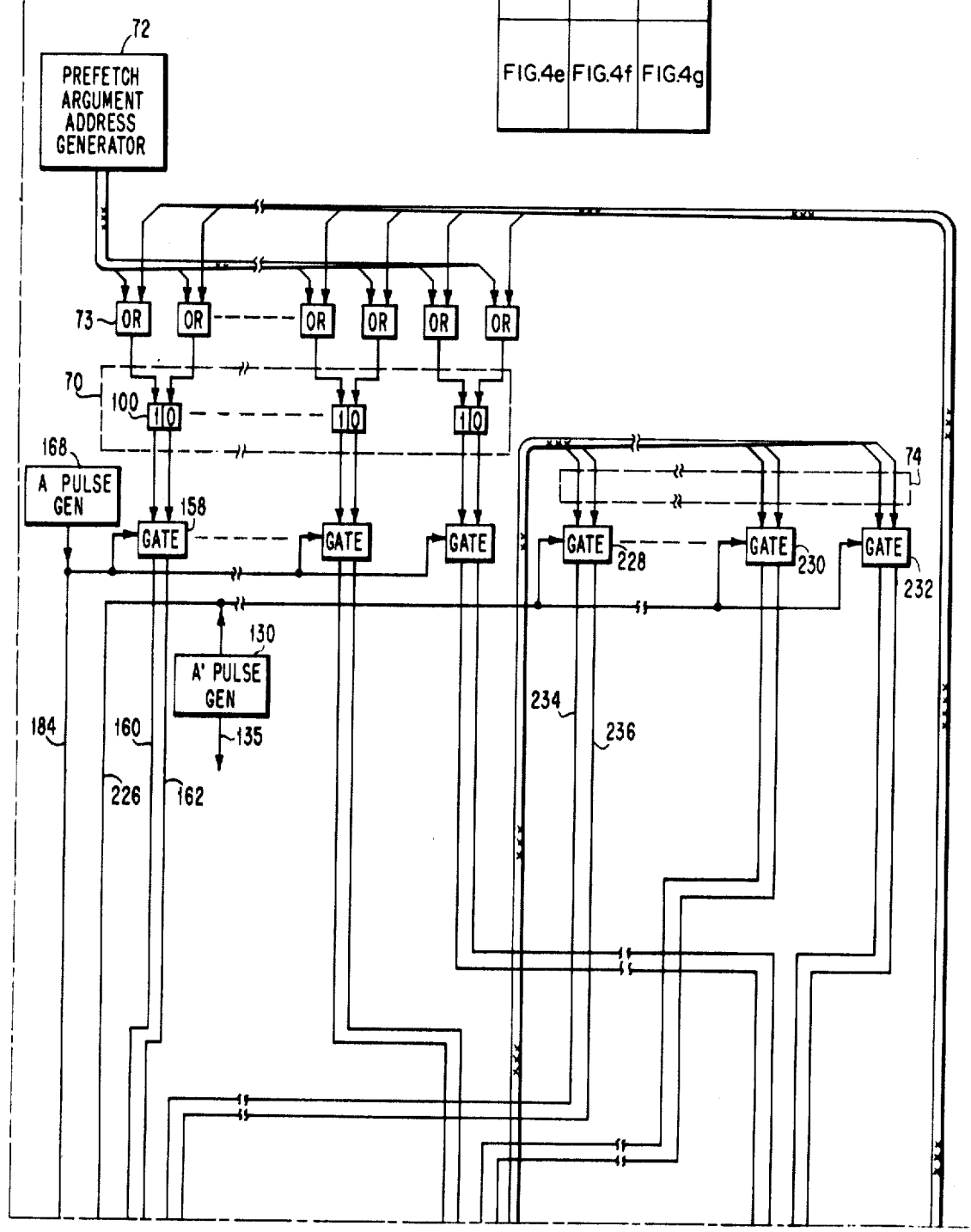

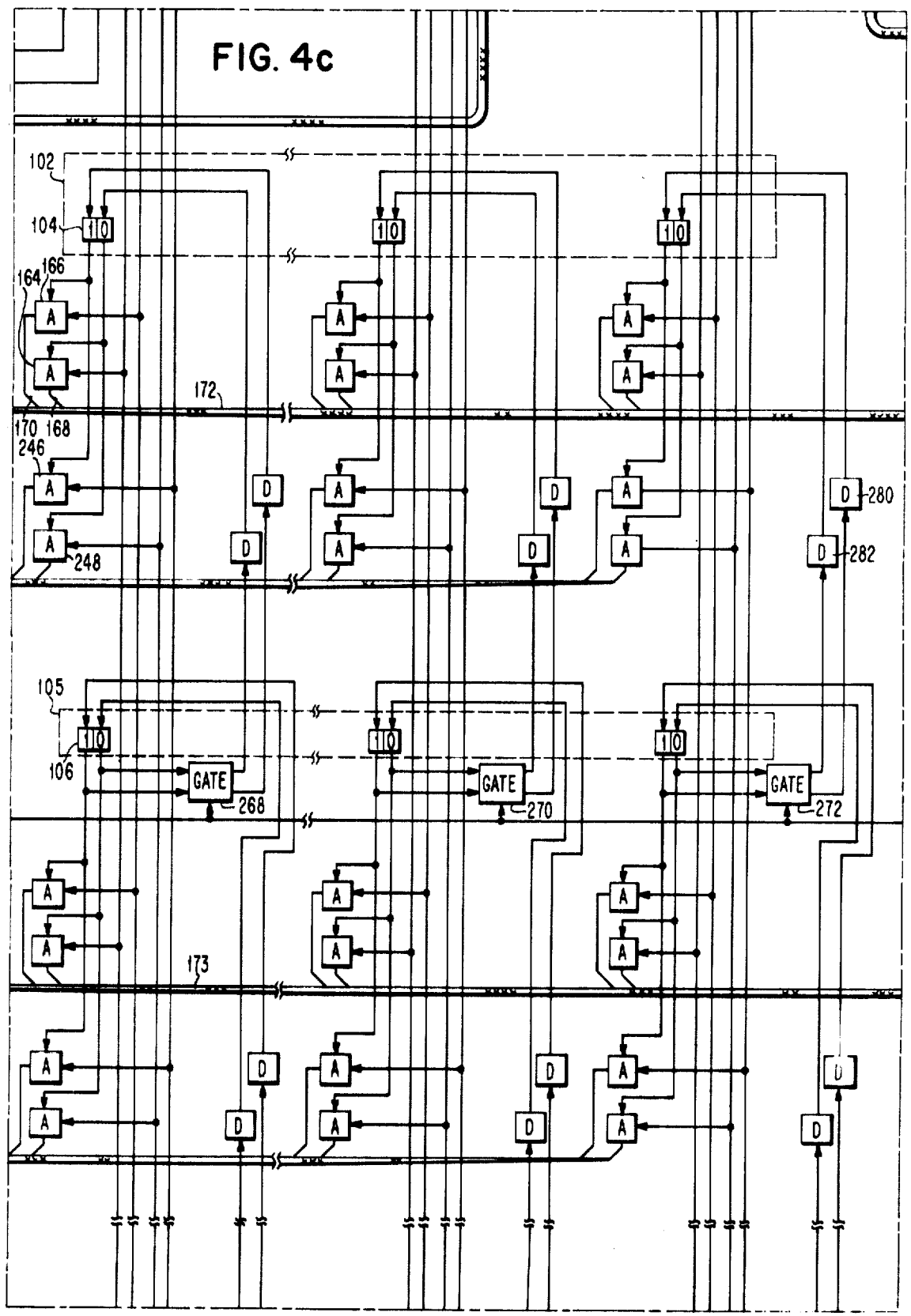

United States Patent Office 3,559,183
Patented Jan. 26, 1971

3,559,183
INSTRUCTION SEQUENCE CONTROL
Edward H. Sussenguth, Los Altos, Calif., assignor to International Business Machines Corporation, Armonk, N.Y., a corporation of New York
Filed Feb. 29, 1968, Ser. No. 709,426
Int. Cl. G06f 7/02
U.S. Cl. 340—172.5          15 Claims

ABSTRACT OF THE DISCLOSURE

Apparatus for recognizing the occurrence of a particular instruction in a stream of instructions and then modifying that stream of instructions is disclosed. A fetch register for receiving instructions from a main memory is provided. A prefetch sequence control register containing the address of a particular instruction, as well as the address of the next instruction to be fetched is also provided. A comparison is continuously made between the instruction address in the fetch register and in the prefetch sequence control register. Upon noting an equality between those two, the second address from the prefetch sequence control register is transferred to the fetch register and the instruction extracted from memory. Means are also provided for inhibiting this operation and providing an address from a related register to the fetch register upon the occurrence of an equality between the address in the prefetch sequence control register and still another related register.

BACKGROUND OF THE INVENTION

(1) Field of the invention

The invention relates to instruction sequencing in a data processing system. More particularly, it relates to altering a stream of instructions by fetching instructions from another area of the data processing system so as to have them ready for implementation when needed.

(2) Description of the prior art

The sequencing of instructions in the prior art has been a problem. Proper sequencing of instructions keeps the various elements of a data processing system busy all the time. Improper sequencing of instructions results in a certain amount of down time while the system waits for a needed instruction so as to continue its data processing.

The prior art has attempted to solve this problem in several ways.

One way is simply to speed up the operation of associated equipment so as to make up the time lost while waiting for needed instructions. However, this has been unsatisfactory. The speed of the associated equipment is presently approaching reasonable limits. Thus, the central processing unit still has a certain amount of unused capacity over any given time period.

A second approach to this problem in the prior art has been to evaluate the expected sequence of instructions in light of the problem requirements. In other words, look ahead in order to see what is required. Sometimes this evaluation is good; sometimes this evaluation falls short in fully utilizing the capacity of the data processing system.

A particular problem in the prior art arises in the branch mode of operation. When a conventional computer reaches a branch instruction, the central processing unit must wait while the next instruction in that branch mode is received from memory. More advanced computers, like the IBM 7030, offer "lookahead" features to solve this problem. However, as noted above, these are not completely satisfactory.

Accordingly, it is a general object of this invention to structure the instruction sequencing within a data processing sytem so as to more efficiently utilize the capability of that system.

A more particular object of this invention is to control the prefetching of instructions in a high speed computer.

Still another object of this invention is to provide sequence control apparatus for prefetching instructions in a non-straight line sequence.

Still another object of this invention is to allow programmer control over the prefetching of instructions in a high speed computer.

Another object of this invention is to provide the programmer control by direct address loading of additional control registers and the concurrent suppression of other associated operations.

Yet another object of this invention is to prefetch instructions in a manner most suitable for the conditional branch operation of a data processing system.

Still another object of this invention is to provide adaptive sequencing of instructions; that is, sequencing according to system need.

Yet another object of this invention is to provide the adaptive sequencing of instructions by remembering a plurality of prior branch instruction streams, recognizing the occurrence of one of said plurality of prior branch instruction streams and operating in accordance with the recognized branch instruction.

A still further object of this invention is to accomplish the prefetching of instructions with a minimum of equipment and a minimum of time.

SUMMARY OF THE INVENTION

Apparatus for the prefetching of instructions as a function of the machine need for those instructions is disclosed. As one aspect of my invention, that apparatus includes a register means for storing the address of an instruction whose occurrence indicates the need for the prefetching of other instructions. That register also includes the storage of the first address of the first other instruction needed. Means are also provided for comparing the addresses of the instructions being fetched from a main memory with the address whose occurrence controls the prefetching of other instructions. Upon an equal comparison, the address of the other instruction noted is generated and the sequence of instructions starting at that address is extracted from main memory. The original sequence of instructions is thereby varied.

In a preferred embodiment, a prefetch argument register is loaded cyclically with an instruction address, such as a branch address. A first series of registers for containing instruction addresses generated from main memory in accordance with the machine program are provided as well as a second series of registers. Each register of said second series is associated with a particular, and distinct, register of said first series. A comparison is made between the contents of the prefetch argument register and each register in the first series of registers; when an equality is noted, a corresponding instruction address is extracted from the associated register in the second series of registers and transferred to the prefetch argument register. Associated apparatus then fetches the instruction identified by that address from main memory and provides it to, for example, an instruction buffer register. If the contents of the prefetch argument register do not match the contents of the first series of registers in any given cycle, the prefetch argument register is incremented under machine (e.g. program) control.

As an extension of my invention, a first additional register associated with the first series of registers is provided. A second additional register, labelled an effective branch address register, is associated with that first additional register. Should an equality be noted between an address in the first series of registers and the address stored in the first additional register, the extraction of an address from the second series of registers is inhibited. The effective branch address is extracted instead and forwarded to the prefetch argument register. At the same time, the address in the first additional register is loaded into a selected register in the first series of registers.

By providing additional circuitry, the apparatus of my invention can be extended to modify the loading of the first series of registers, thereby essentially varying the operation of the prefetch sequence control apparatus. The first additional register noted earlier and called an alpha, or a load argument, register is utilized. That register contains the address of a branch instruction; a branch instruction connotes exit from an address set forth in the first series of registers to some address other than that associated with the exit address in the second series of registers. That other address has to be inserted in the second series of registers. This is accomplished by comparing the address stored in the load argument register with the addresses stored in the first series of registers; noting an equality between the two; and inserting the desired new address in the second series of registers. In order to maintain a correspondence between the address in the first series of registers and that in the second series of registers, both registers are loaded simultaneously with the new information. This can be done by either inserting the new information in an invalid location in both the first and second series of registers, or merely shifting up the information in both the first and second series of registers and inserting the new information in the now vacant bottom position of each register series.

The apparatus of my invention offers a number of significant advantages. Perhaps the primary advantage is the ability to tailor the stream of instructions supplied to an instruction execution unit (like a central processor) in a manner utilizing the full capacity of that instruction execution unit. This can be done under program control via the setting of registers.

The invention set forth in this patent application can be embodied in relatively simple apparatus once the functional solution to this problem has been recognized. Conventional register components, conventional AND/OR gates and conventional associated control circuitry (along with recognized equivalents for each) are used.

The prefetch sequence control register can be loaded at the occurrence of either an unconditional branch or a conditional branch operation. One or two addresses along the most probable branch path can similarly be loaded at that time. All these steps result in the fetching of instructions, as dictated by the need of the instruction execution unit.

Accordingly, the foregoing and other objects, features and advantages of the invention will be apparent from the following more particular description of preferred embodiments of the invention, as illustrated in the accompanying drawings.

BRIEF DESCRIPTION OF THE DRAWINGS

FIG. 3 is a still more detailed block diagram of my invention showing a preferred embodiment in block diagram form.

DESCRIPTION OF A PREFERRED EMBODIMENT

Figure 1:
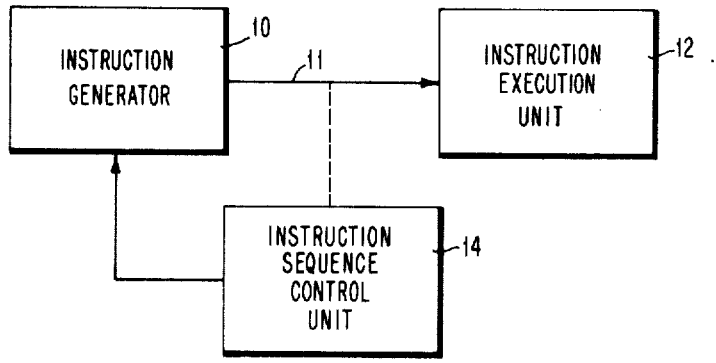
FIG. 1 is a simplified block diagram of my invention.

FIG. 1 shows my invention in outline fashion. Instruction generator 10 provides a sequence of meaningful, addressed, instructions in coder form on line 11 to instruction execution unit 12. Those instructions contain data to be processed by instruction execution unit 12, as well as directions (or instructions) as to the manner in which that data is to be processed by instruction unit 12. The sequence in which those instructions are generated by instruction generator 10 is determined by the operations necessary to produce the solution to a problem, as well as the availability of certain portions of instruction execution unit 12 to perform those operations. Accordingly, instruction sequence control unit 14 continuously monitors the stream of instructions flowing from instruction generator 10 by looking at the addresses of the instructions. Instruction sequence control unit 14 contains a series of instructions which are used to modify the stream of instructions generated by instruction generator 10 in accordance with a more advanced knowledge of the operations needed to solve a given problem and the availability of portions of instruction execution unit 12. The function of instruction sequence control unit 14 then is to look at the instructions flowing from instruction generator 10 and, upon noting the presence of one or more particular instructions, to modify the operation of instruction generator 10 so as to result in a more efficient utilization of instruction execution unit 12. This is accomplished by monitoring addresses; which, in turn, are representative of instructions.

Figure 2:
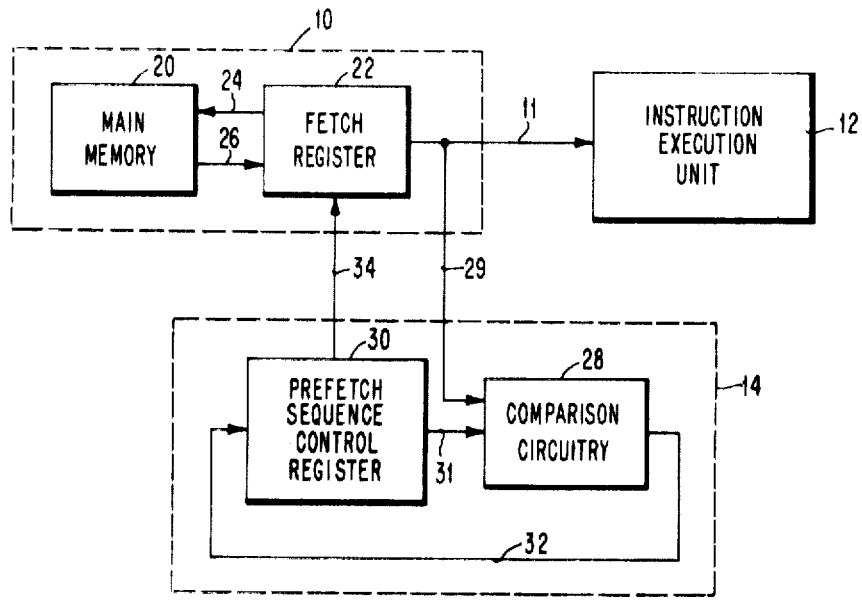
FIG. 2 is a block diagram of my invention showing in somewhat more detail the interaction of the necessary apparatus.

FIG. 2 shows in somewhat more detail the apparatus of my invention. Instruction generator 10 comprises, in outline form, a main memory 20 cooperating with a fetch register 22. (Register, as used in this patent application, includes both a single register or a plurality of associated registers having a functional interrelationship.) Main memory 20 has instructions stored in addressed locations. Those instructions are fetched from main memory 20 in accordance with signals sent out on line 24; the instructions are furnished to fetch register 22 on line 26. As noted, those instructions are forwarded from fetch register 22 on line 11 to instruction execution unit 12. Instruction sequence control unit 14 includes both comparison circuitry 28 and prefetch sequence control register 30. Comparison circuitry 28 receives as an input on line 29 the addresses of instructions flowing from instruction generator 10 on line 11. Comparison circuitry 28 also receives, as an input, the addresses of certain instructions stored in prefetch sequence control register 30; they are supplied on line 31. If an equality is noted between an instruction address occurring on line 29 and an instruction address occurring on line 31, comparison circuitry 28 issues a signal on line 32 to the prefetch sequence control register 30. That signal on line 32 causes prefetch sequence control register 30 to generate on line 34 an instruction address stored within prefetch sequence control register 30. Line 34 serves as an input to fetch register 22, causing the operation in fetch register 22 to be interrupted and thereby modifying the flow of instructions provided on line 11. Instruction execution unit 12 then operates in accordance with a modified sequence of instructions.

Having set forth my invention in outline fashion, apparatus capable of implementing a preferred embodiment of that invention, as shown in FIG. 3, will now be described.

A first series of registers 50, comprising a plurality of individual registers A1–A8, inclusive, is disposed in operative relationship to a second series of registers 52 comprising a plurality of individual registers B1–B8, inclusive. Associated with the first series of registers 50 is an alpha register 54 and that is disposed in operative relationship to an effective branch address (EBA) register 56, containing the instruction address to which the associated data processing system should transfer control upon the occurrence of a branch (or other) control signal. An alpha register address generator 58 loads alpha register 54, while an EBA register address generator 60 loads EBA register 56. There is a validity bit circuit associated with each register A1–A8, inclusive, as well as the alpha register 54; only the validity bit circuits 62, 63, 64 and 66 are shown for simplicity. Reset pulse generator circuitry 68 is connected so as to provide a pulse to one or all of the validity bit circuits 62, 63, 64, 66, as will be explained more fully. Prefetch argument register 70 is loaded initially by the prefetch argument address generator 72. A load argument register 74 is also provided for controlling the loading of a new control instruction address in the prefetch argument register 70. Note at this point that alpha register 54 and load argument register 74 can be (and usually are) one and the same collection of equipment. They have been drawn in this manner and described as if they are two registers (which they could be) for ease of describing the invention and simplifying subsequent drawings.

With reference to the operation of FIG. 3, and in brief outline form, a comparison is made between the contents of prefetch argument register 70 and the first series of registers 50, as well as alpha register 54. If the associated validity bit circuits are set to a positive indicating condition, and if an equality is noted between the contents of prefetch argument register 70 and one of the registers A1–A8, or alpha register 54, the contents of the associated register B1–B8 or EBA register 56 is transferred to the prefetch argument register 70. At the same time, the contents of one of the second series of registers 52, or EBA register 56, is passed on to main memory 20 (FIG. 2) and an addressed instruction generated from main memory 20. Thus, the sequence of instructions provided to the instruction execution unit 12 has been varied and a new sequence of instructions is provided to unit 12. Note that prefetch argument register 70 performs the same function as fetch register 22 (FIG. 2) and in some embodiments could be one and the same piece of equipment.

A second mode of operation is available for the equipment of FIG. 3. This mode enables the equipment to utilize past branches to control future equipment operation. That is, if a prior branch address is encountered, it is assumed that the instruction sequence should be modified in the same manner as when that branch address occurred earlier. To accomplish this, a comparison is made between alpha register 54 (load argument register 74) and each of the registers A1–A8. If an equality is noted, or if a validity bit circuit of one said A register is set to zero, the contents of certain A registers are shifted up, contents of alpha register 54 inserted in the first series of registers 50, and the effective branch address register 56 transferred to the second series of registers 52.

In oder to fully understand my invention, it is necessary to more fully review a preferred embodiment of that invention. This will be done in connection with FIG. 4, which is a composite showing of FIGS. 4a–g inclusive. First, the structure of FIG. 4 will be described, then the operation of that structure explained.

With reference to FIG. 4, it should be remembered that it is desired to compare the contents of prefetch argument register 70 with registers A1–A8 and alpha register 54; note an equality between one said register and prefetch argument register 70; and transfer the contents of an associated register to prefetch argument register 70. Pefetch argument register 70 is shown as compising a plurality of flip-flops, one of which, flip-flop 100, is numbered. There are as many flip-flops in prefetch argument register 70 as there are bit positions in an instruction word. Similarly, there are as many flip-flops in prefetch argument register 70 as there are flip-flops in each of the registers A1–A8 and B1–B8. Register A1 is numbered 102 and one of the flip-flops therein, flip-flop 104, is numbered. Register A2 is numbered 105 and a flip-flop 106 identified; register A8 is numbered 108 and a flip-flop 110 therein identified; register B1 is numbered 112 and a flip-flop 114 identified therein; register B2 is numbered 116 and a flip-flop 118 identified therein; and register B8 is numbered 120 and a flip-flop 122 identified therein. Each of the identified flip-flops represents an ordered (e.g., the highest order) bit position within the associated register. Validity bit circuits 62, 63, 64, 66 are shown as comprising individually a single flip-flop. Each validity bit circuit, such as 62, has an OR circuit, such as OR 124, connected to provide an input to the 0 bit position of the validity bit circuit. One input to each associated OR circuit, such as OR 124, is provided by reset pulse generator 68. When a validity bit circuit, such as validity bit circuit 62, is set to the 0 state, the equipment essentially ignores the contents of the A and B registers associated with that validity bit circuit (such as registers 102 and 112). Timing pulses are necessary for the operating of this circuitry and various timing pulse generators are shown. For example, pulse generator 128 generates an A pulse; pulse generator 130 generates an A' pulse; pulse generator 132 generates an A'D pulse; and, lastly, pulse generator 134 generates an AD pulse. These timing pulses are supplied to various circuitry components. For clarity's sake, lines leaving the various pulse generator boxes are numbered and corresponding numbers are provided at those circuits to which pulses from those pulse generators are supplied. For example, pulse generator 130 supplies a pulse on line 135 to delay circuit 136 (FIG. 4e). Likewise, lines 138, 140, 142 leave pulse generator 132 (FIG. 4b). Pulse generator 134 (FIG. 4d) has lines 144, 146 and 148 leaving it. Various cables are provided in FIG. 4, such as cable 156 which transfers the contents of the B1–B8 registers or EBA register 56 to prefetch argument register 70.

There is more structure shown in FIG. 4. However, for ease of understanding, it will be identified and labelled in the following discussion of the operation of that structure.

There are two modes of operation possible for the structure shown in FIG. 4. The first mode to be discussed is the prefetch mode. In this mode, it is desired to perform an association between the information contained in prefetch argument register 70 and one of the A1–A8 registers, or the alpha register 54. In order to accomplish this, it is necessary first to load the various registers. Prefetch argument register 70 is first loaded by signals from associated OR circuits, like OR 73, energized by signals from prefetch argument address generator 72. The loading of the register 50, 52 is accomplished as explained subsequently under a discussion of the "load" mode of operation.

The prefetch mode of operation is now to be explained.

In order to explain the association operation necessary during a prefetch, consider flip-flop 100 in prefetch argument register 70 and flip-flop 104 in A1 register 102. Note that flip-flop 100 is connected to a gate 158 and there are similar gates connected to each of the flip-flops in prefetch argument register 70. Also connected to gate 158 is "A" pulse generator 128. Leading from gate 158 are two lines 160 and 162. When "A" pulse generator 128 provides an A pulse to gate 158, an output signal will appear on line 160 if flip-flop 100 has been set to the one state; by contrast, if flip-flop 100 has been set to the zero state, an output will appear on line 162. Line 160 extends down through the first series of registers 50 and provides an input to AND circuit 164, associated with the flip-flop 104 of A1 register 102. Similarly, line 162 extends down and provides an input to AND circuit 166, also associated with flip-flop 104 of A1 register 102. The other input for AND circuit 164 comes from the zero bit position of flip-flop 104. The second input for AND circuit 166 comes from the one bit position of flip-flop 104. Should flip-flop 100 in prefetch argument register 70 be set to one, there will be an output on line 160 and that will be provided as one input to AND circuit 164. In order to obtain an output from AND circuit 164 on line 168, it will be necessary for flip-flop 104 in A1 register 102 to be set to zero. If this is so, then there is no match between flip-flop 100 and flip-flop 104. In other words, an output on line 168 from AND circuit 164, or an output on line 170 from AND circuit 166, indicates that there is no association between flip-flop 100 in prefetch argument register 70 and flip-flop 104 in A1 register 102. A similar comparison of the state of the flip-flops in prefetch argument register 70 and A1 register 102 is accomplished on a bit position-by-bit position basis with similar apparatus. Thus, any signal present on cable 172 indicates that there is a dissimilarity between the contents of prefetch argument register 70 and the A register (102 being analyzed; similarly, any signal on cable 173 associated with A2 register 105 indicates a dissimilarity between the contents of prefetch argument register 70 and register 105. If there is a dissimilarity, then the contents of the associated B1 register (register 112 for A1 register 102) should not be forwarded to prefetch argument register 70. The inhibition of this transfer of data from B1 register 112 to prefetch argument register 70 is accomplished through the cooperation of OR circuit 174 in FIG. 4d. OR circuit 174 receives as an input, from cable 172, a signal generated by any of the AND circuits associated with the flip-flops in register 102. Note that there are two AND circuits (164, 166) associated with each flip-flop (104) in A1 register 102. It is the output from such AND circuits (168, 170) that passes along cable 172 to the input of OR circuit 174. The presence of only one signal at the input to OR circuit 174 results in an output on line 175 to inverter circuit 176. The output of inverter 176 is provided to AND circuit 180, which also receives as a second input, a pulse from pulse generator 134. This is a delayed version of the pulse generated by pulse generator 128; it is delayed by an amount sufficient to allow the association operation between the contents of prefetch argument register 70 and A1 register 102 to take place. Inverter 176 will provide an input to AND circuit 180 only if there is an equality between the contents of prefetch argument register 70 and A1 register 102. In addition, another condition must be met; namely, that validity bit circuit 62 is set to a one (or valid) state. AND circuit 182 performs this role in cooperation with a pulse from pulse generator 128 on line 184. Should the validity bit circuit 62 be set to the one state, there will be no output from AND circuit 182 onto cable 172 and the inverter 176 will have no output. Thus, no output will be available from AND circuit 180 and, absent such an output, none of the gates 185, 186, 188 associated with B1 register 112 will be energized; absent energization of gates 185, 186, 188, the contents of B1 register 112 will not be transferred onto cable 156. Delay circuit 183 is simply for timing purposes; i.e., synchronization.

In other words, either a single disparity between prefetch argument register 70 and register 102, or validity bit circuit 62 being set to zero, will prevent register 112 from being gated out. If an association is present, the contents of register 112 are gated out to cable 156 via gates 185, 186, 188.

So far, with reference to FIG. 4, the association operation between the contents of prefetch argument register 70 and the contents of A1 register 102 has been described. Similar circuitry and similar operation is provided for each of the other A registers; such as A2 register 105 all the way down to A8 register 108. Note however that the association lines from prefetch argument register 70 (such as association lines 160, 162) lead down to alpha register 54, as well as to the A1–A8 registers.

An association operation between alpha register 54 and prefetch argument register 70 will now be described.

Figure 4B:
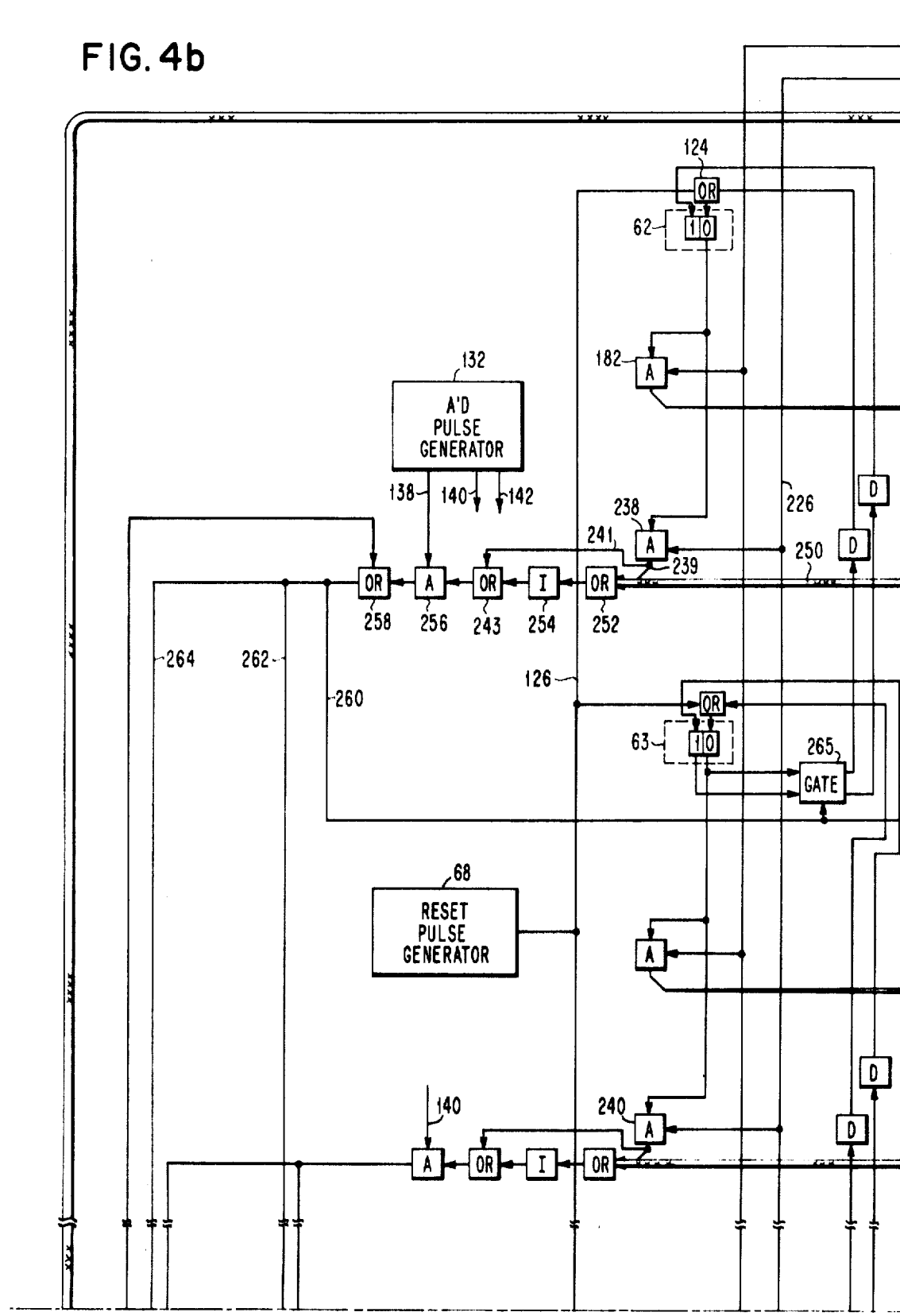
FIG. 4 is a composite diagram of FIGS. 4a–4g showing circuitry capable of operating as a preferred embodiment of my invention.
Figure 4D:
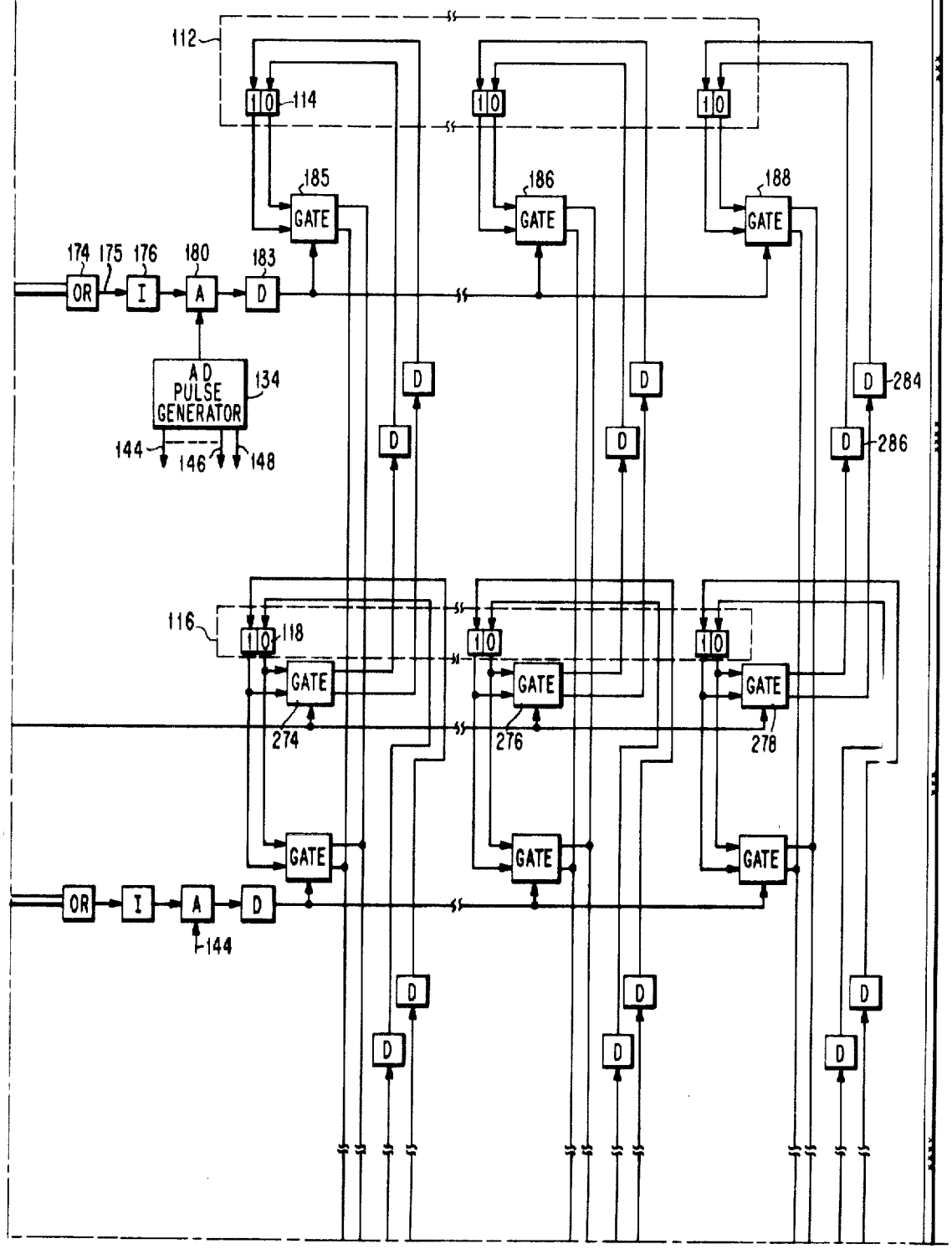
Figure 4E:
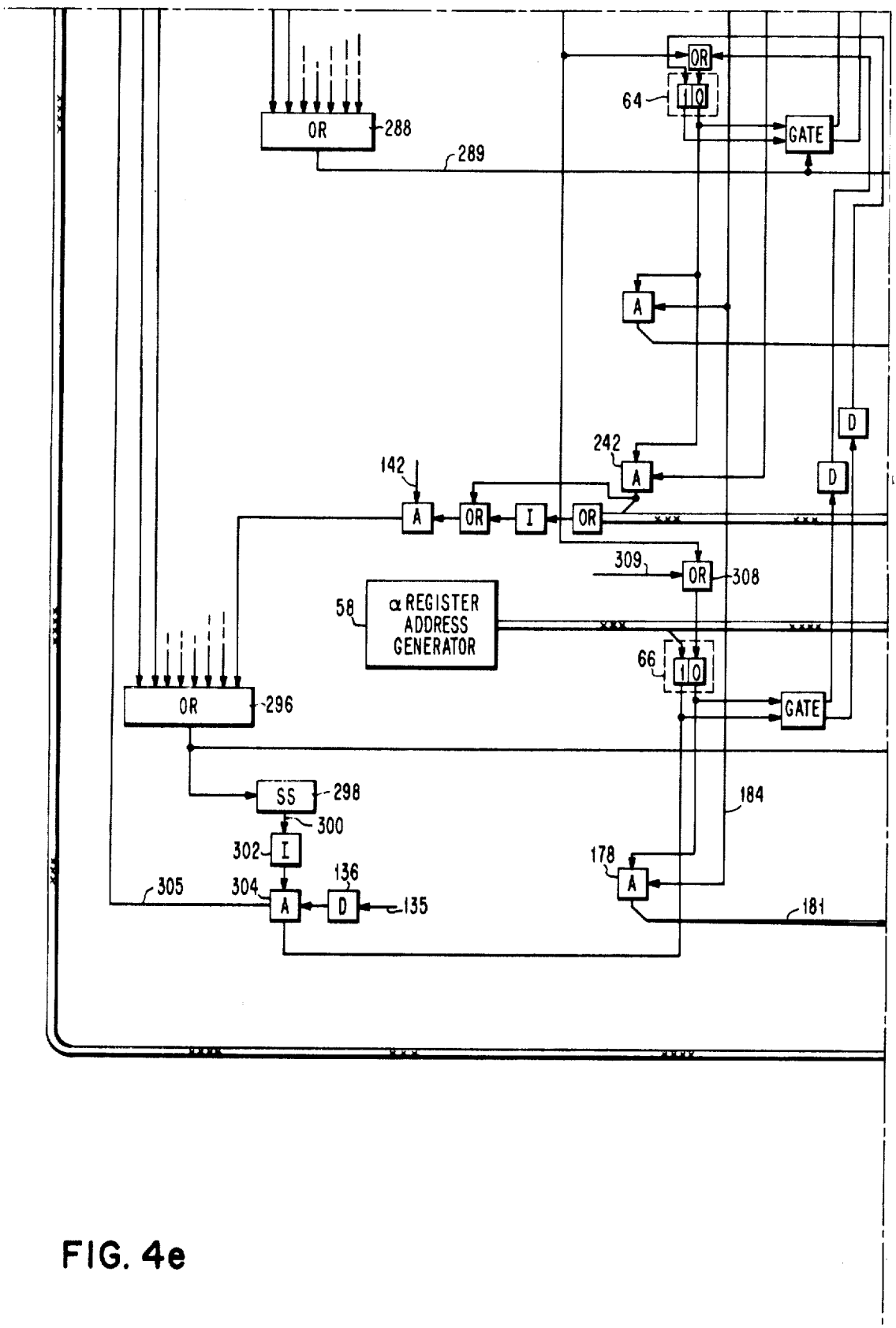
Figure 4F:
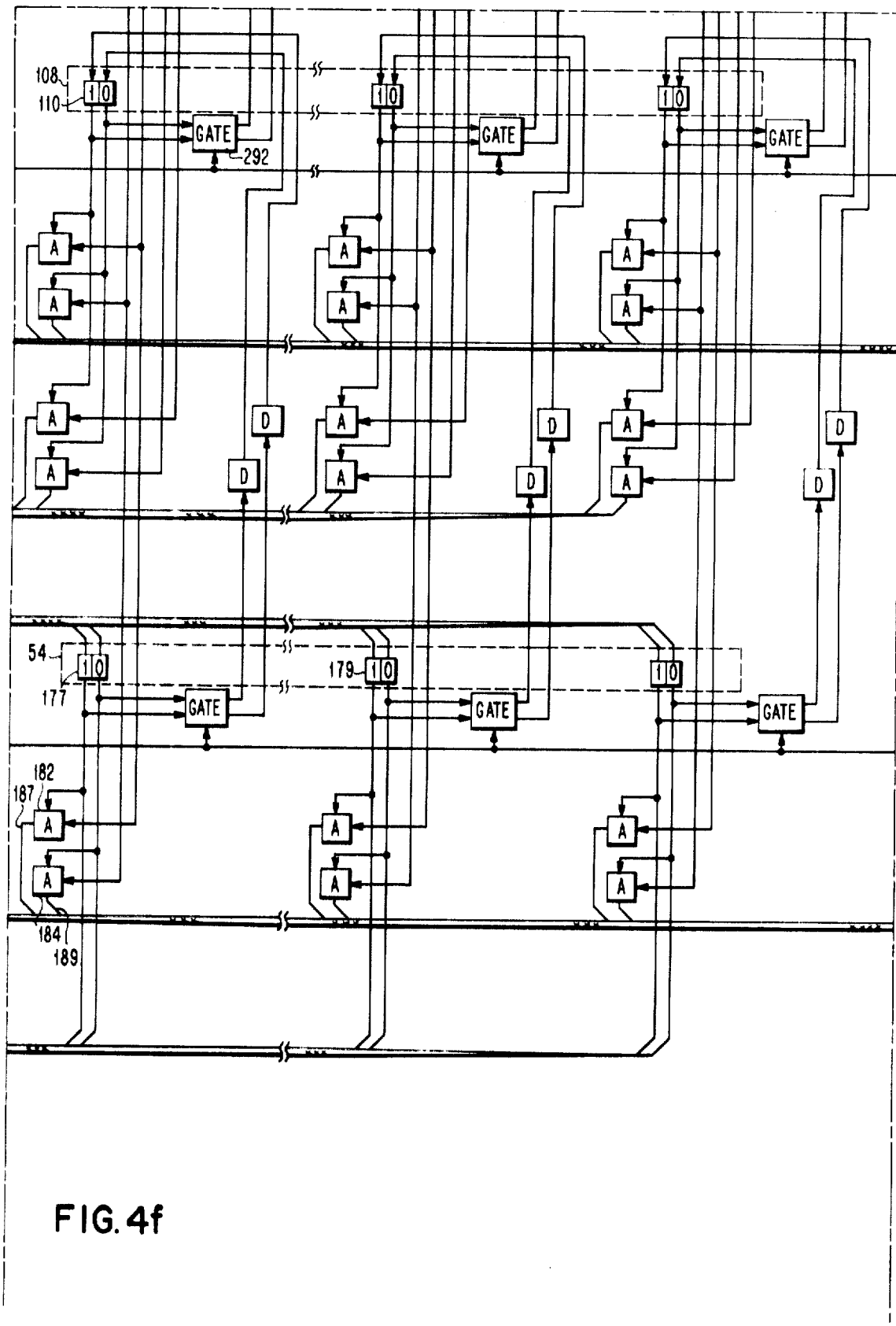
Figure 4G:
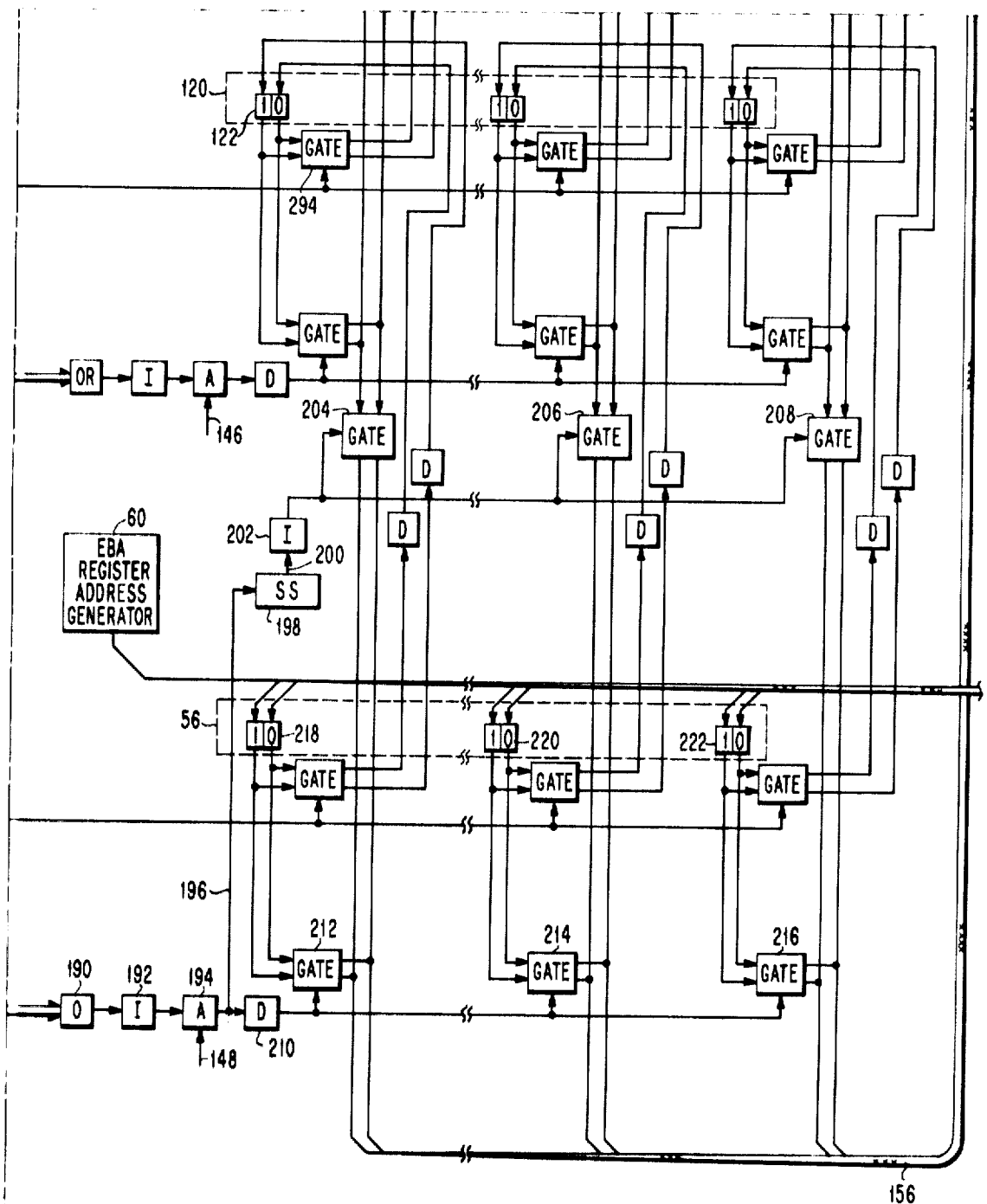

There is validity bit circuit 66 associated with alpha register 54. Alpha register 54 comprises a plurality of flip-flops, such as 177 and 179; there are as many flip-flops in alpha register 54 as there are flip-flops in prefetch argument register 70. AND circuit 178, associated with validity bit circuit 66, tests, with the cooperation of a pulse on line 184 from A pulse generator 128, the status of validity bit circuit 66. If validity bit circuit 66 is set to the one, or valid, state, there will be no output available from AND circuit 178. The output of AND circuit 178 is connected to cable 181. Having made that test (as to the status of the validity bit circuit 66), a test of the state of the flip-flops in prefetch argument register 70 and alpha register 54 is accomplished in the following manner. Associated with the first flip-flop 177 are a plurality of AND circuits 182, 184; AND circuit 182 receives as an input a signal from the one position of flip-flop 177 and a signal from line 162 connected to the zero position of flip-flop 100. AND circuit 184 receives as an input a signal from the zero position of flip-flop 177 and a signal on line 160 representing the one bit position of flip-flop 100. Line 187, the output of AND circuit 182, and line 189, the output of AND circuit 184, leads to cable 181. Should there be an equality between flip-flop 100 and flip-flop 177, neither line 187 nor 189 will have an output. A similar comparison of each of the flip-flops in alpha register 54 is made with each of the flip-flops in prefetch argument register 70. Should there be an equality between each, and should validity bit circuit 66 be set to the one state, there will be no input provided to OR circuit 190 (FIG. 4g). Inverter 192 will then provide an input to AND circuit 194, which is also receiving as an input a signal on line 148 from pulse generator 134. An output from AND circuit 194 on line 196 is provided to single shot 198 (FIG. 4g). The output 200 of single shot 198 becomes active for a predetermined length of time and is inverted by inverter circuit 202, thereby inhibiting gates 204, 206, 208, inclusive. Inhibition of those gates, associated with the B registers 52, prevents any information from being transferred out of registers B1–B8, inclusive. While those registers are inhibited, the output of AND circuit 194 is also provided to the delay circuit 210 and from there to gates 212, 214, 216, inclusive. Each of those gates 212, 214, 216 receives as an input a signal from an associated flip-flop 218, 220, 222 in EBA register 56. The contents of EBA register 56 are thereby transferred via gates 212, 214, 216, inclusive, to cable 156 and then into prefetch argument register 70.

Summarizing the operation of the prefetch apparatus, note that an association is made between the contents of the prefetch argument register 70 and a first series of registers A1–A8. If an association is indicated on one of those registers, then the contents of an associated B register, B1–B8, is transferred via cable 156 to prefetch argument register 70. If, however, an association is noted between the contents of prefetch argument register 70 and alpha register 54, then the transfer of data from registers B1–B8 is inhibited; rather, the transfer of data from EBA register 56 is initiated and accomplished on cable 156.

A second mode of operation for the structure set forth in FIG. 4 will now be described. That mode of operation is labeled "load." It occurs before or after one or more prefetch operations have taken place. The end of a prefetch operation is indicated (or implemented) by the termination of the A pulse from A pulse generator 128. The A' pulse from A pulse generator 130 starts the "load" operation, as will now be described.

In the "load" operation, it is desired to take the contents of load argument register 74, search for a register to receive them in the first series of registers 50, insert the contents of load argument register 74 in a particular register in the first register series 50, and shift the remaining contents of the registers in the first series of registers 50 accordingly; it is also necessary to insert information in the second series of registers 52 and shift the remaining information therein accordingly.

To start the "load" operation, the contents of load argument register 74 must be gated through the first series of registers 50, and that action is accomplished by providing an A' pulse from A' pulse generator 130 on line 226. The A' pulse on line 226 is supplied to each of the gates 228, 230, 232 shown as associated with the load argument register 74. Those gates 228, 230, 232 provide the contents of load argument register 74 to each register in the first series of registers, such as register 102, 105, 108 via lines such as 234, 236 associated with gate 228 and similar unnumbered lines associated with each of the other gates. Note that those lines (such as 234, 236) extend through the A1–A8 registers. The A' pulse from A' pulse generator 130 on line 226 not only effectively transfers the contents of load argument register 74, but it also tests the status of validity bit circuit 62, 63, 64 in cooperation with AND circuits 238, 240, 242. For example, an output will be present on line 239 from AND circuit 238, only if there is a pulse present from pulse generator 130 on line 226 and if the validity bit circuit 62 is set to the zero state. That same output will be available on line 241 coming out of AND circuit 238 and connected to OR circuit 243 for the following reason: even if there is no association between load argument register 74 and A1 register 102, register 102 can still be rewritten if validity bit circuit 62 is set to the zero state. The output on line 241 accomplishes this. This will be explained more fully shortly.

Assume now that the A' pulse has been generated from A' pulse generator 130 and that an association is being made between the contents of load argument register 74 and those registers 102, 105 through 108. Since the structure and operation is the same for each register, this can best be explained by looking only at one register—such as register 102. Associated with an ordered bit position flip-flop 104 of register 102 are additional AND circuits 246, 248 whose operation resembles that of AND circuits 164, 166. That is, if the contents of flip-flop 177 in load argument register 74 is the same as the contents of flip-flop 104 in register 102, there will be no output available from either AND circuit 246 or AND circuit 248; if, however, the contents are different, then both AND circuits 246, 248 will provide an output. The outputs of AND circuits 246, 248 are passed on to cable 250 which in turn feeds OR circuit 252. If validity bit circuit 62 is set to the one state, and if there is an association between each bit position in load argument register 74 and each bit position in register 102, then there will be no signals present on cable 250. At that time, there will be no output present from OR circuit 252 and inverter circuit 254 will then have an output. That output of inverter 254, when to OR circuit 243 results in an output from OR 243, which is ANDed at AND circuit 256 with a signal from A'D pulse (a delayed A' pulse) generator 132 on line 138, thereby providing an input to OR circuit 258. OR circuit 258 sends out an output on a number of lines; lines 260, 262, through 264. Line 260 serves as an input to each of the gates 266, 268, 270, 272 associated respectively with validity bit circuit 63 and the flip-flop positions of A2 register 105. Similarly, line 260 provides a signal to gates 274, 276, 278 associated with B2 register 116. All those gates mentioned (gates 266–278) are opened, thereby transferring the contents of validity bit circuit 63, and register 105 through associated delay circuits (only two of which, 280, 282 in FIG. 4c, are numbered) up into validity bit circuit 62 and A1 register 102. The contents of B2 register 116 are similarly shifted up through delay circuits (like 284, 286) into the B1 register 112. Similarly, the output from OR circuit 258 on line 262 is applied to OR circuit 288 resulting in a signal on line 289. Through the cooperation of gates, like gates 292, 294, the contents of A8 register 108 are shifted up into the A7 register, not shown; the contents of B8 register 120 are shifted up into B7 register, not shown. OR circuit 296 receiving an input on line 264 from OR 258 performs the same function with alpha register 54 and EBA register 56; that is, the contents of both registers 54, 56 are shifted up into the registers 108, 120. However, OR circuit 296 also provides an output to single shot 298.

Before talking about that, note that the shift operation just described could also be implemented by the fact that one validity bit circuit, like validity bit circuit 62, is set to the invalid or zero state. Then, an output from AND circuit 238 will be present on line 241 to OR circuit 243; an output will then be present from OR circuit 258, as just described, causing all these operations to take place.

Returning to the operation of single shot 298, single shot 298 has an output on line 300 for a predetermined period of time in accordance with the characteristics of single shot 298. This output on line 300 is inverted by the inverter circuit 302 and is used to inhibit AND circuit 304. Note that the output from AND circuit 304 is normally returned on line 305 to OR circuit 258 in order to institute the shift operation just described when two conditions are met:

(1) Validity bit circuit 66 is set to the "one" state; and
(2) The A' pulse is made available to delay circuit 136 on line 135 (as is the case when the "load" operation is started).

When this happens, the output of AND circuit 304, on line 305, passes on to OR circuit 258 and shifts up the contents of every register in both register series 50, 52 one level. So, unless an association in registers 102, 105, 108 has taken place, AND circuit 304 will initiate the shift operation if validity bit circuit 66 is set to the "one" state (and that is set to the "one" state by alpha register address generator 58). Even the noted operation can be suppressed, though, by an output from OR 296 firing single shot 298. Lastly, note that if OR circuit 308 is set by a signal on line 309 (indicating an unsuccessful branch in a usual computer operation), then the validity bit circuit 66 will be set to the zero state and none of the register contents will be shifted.

So far, the operation of this apparatus during a prefetch and a load cycle have been described. The apparatus and its operation has been set forth in reference to a particular number of registers; any number of registers could be used in another embodiment. In addition, the AND or OR circuits and inverters, etc., are conventional and will not be described further. It should also be recognized that the equipment described finds primary utilization within larger data processing systems, many of whose parts have not been shown for simplicity's sake.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. An improved instruction-fetching apparatus for a computing system utilizing a plurality of machine instructions normally identified by addresses, including memory means for storing said instructions and fetching means providing a sequence of memory addresses for extracting said instructions from said memory means, wherein the improvement comprises:

fetching sequence control means for controlling the operation of said fetching means, said fetching sequence control means including means responsive to the occurrence of a predetermined address of said provided sequence of memory addresses for altering the sequence of addresses provided by said fetching means.

2. The combination of claim 1 is further characterized by:
said fetching sequence control means including register means having a plurality of instruction addresses stored in said register means, and means for substituting one said instruction address from said register means for one said instruction address in said sequence of instruction addresses in response to a comparison between one said address in said sequence of instruction addresses and one said address in said register means.

3. The apparatus of claim 2 is further characterized by:
said instruction generating means including means for extracting instructions from said memory means in accordance with said sequence of instruction addresses.

4. An improved instruction-fetching apparatus for a data processing system including a memory for storing addressed instructions, fetching means for fetching said addressed instructions from said memory in an ordered relationship, and means for generating a stream of addressed instructions, wherein the improvement comprises:
means responsive to one said address in said stream of addressed instructions for modifying said stream of addressed instructions by inserting a separate addressed instruction, the addresses of said last-mentioned instruction having been stored in said last-mentioned means.

5. An instruction sequencing apparatus of the type set forth in claim 4 wherein said means responsive to one said address includes means for forwarding said address stored in said last-mentioned means to said fetching means, thereby causing said fetching means to fetch an instruction from said memory, said instruction having been stored at said address in said memory.

6. An improved calculator including a memory for storing addressed instructions, an instruction execution unit, and fetching register means for fetching instructions chronologically from a predetermined point in said memory and forwarding said instructions in sequence to said execution unit, wherein the improvement comprises:
storage means including in said fetching register means for translatory storing an instruction address;
sequence control register means having at least a first and a second instruction address stored therein; and
means responsive to an equality between one said at least one first instruction address in said sequence control register means and one said address in said storage means in said fetching register means for fetching another instruction from said memory and supplying said other instruction to said fetching register means.

7. The combination of claim 6 wherein the location of said other instruction is identified by said second instruction address in said sequence control register means.

8. An improved instruction sequencer in a data processing system which includes:
first storage means for storing a plurality of addressed instructions,
second means for storing said addressed instructions fetched sequentially from said first storage means, and
third means for extracting said instructions from said second means in a serial fashion, wherein the improvement comprises:
fourth means for storing a plurality of instruction addresses including associated first and second addresses;
fifth means for comparing instruction addresses in said second means with said first addresses in said fourth means;

sixth means responsive to an equal comparison for fetching from said first storage means an instruction denoted by an associated second address in said fourth means; and
means responsive to said third means for executing said instructions.

9. An improved instruction sequencing apparatus in a data processing system including a memory for storing addressed instructions and fetching means for fetching said addressed instructions from said memory in an ordered relationship, including means for generating a stream of addressed instructions, wherein the improvement comprises:
prefetch argument register means for translatory storing the address of a machine instruction;
first register means for storing a plurality of instruction addresses;
second register means for storing a plurality of instruction addresses;
comparison means for comparing individual addresses stored in said first register means with said address stored in said prefetch argument register means and for generating an equality signal in response to an equality between two said compared addresses; and
transfer means responsive to said comparison means for transferring an instruction address in said second register means associated with the address in said first register means to said prefetch argument register means.

10. Apparatus of the type set forth in claim 9 and characterized by the addition of validity bit circuit means for controlling the operation of said transfer means.

11. Apparatus of the type set forth in claim 10 and characterized by portions of said first register means being associated with portions of said second register means and by each said validity bit circuit means being associated with one said portion of said first register means for inhibiting the transfer of an instruction address stored in the associated portion of said second register means.

12. Apparatus of the type set forth in claim 9 and further including:
third register means having an instruction address stored therein;
fourth register means having an address stored therein;
means responsive to a comparison between said address stored in said third register means and said address stored in said prefetch argument register means for indicating an equality therebetween; and
means responsive to said equality indication for transferring the contents of said fourth register means to said prefetch argument register means.

13. Apparatus of the type set forth in claim 12 and further including:
inhibiting means for inhibiting the transfer of information from said second register means to said prefetch argument register means upon the simultaneous occurrence of a tripartite equality between one said address in said first register means and said address in said third register means and said address in said prefetch argument register means.

14. Apparatus of the type set forth in claim 13 and further including:
means for shifting the addresses stored in associated portions of said first and said second registers; and
means for transferring the contents of said third register means and said fourth register means to associated portions of said first and said second register means upon the operation of said means for shifting the address.

15. Apparatus of the type set forth in claim 13 and further including:
means for transferring the contents of said third register means and said fourth register means to associated portions of said first and said second register means; and means responsive to said validity bit circuit means for controlling the operation of said last-mentioned means.

References Cited

UNITED STATES PATENTS

| 3,354,430 | 11/1967 | Zeitler et al. | 340—172.5 |
| 3,359,544 | 12/1967 | Macon et al. | 340—172.5 |
| 3,402,396 | 9/1968 | McBride | 340—172.5 |
| 3,408,630 | 10/1968 | Packard et al. | 340—172.5 |
| 3,427,592 | 2/1969 | Bahnsen et al. | 340—172.5 |
| 3,437,998 | 4/1969 | Bennett et al. | 340—172.5 |
| 3,445,818 | 5/1969 | Yen | 340—172.5 |

PAUL J. HENON, Primary Examiner

R. F. CHAPURAN, Assistant Examiner